United States Patent [19]

Isozaki

[11] Patent Number: 5,696,212

[45] Date of Patent: Dec. 9, 1997

[54] METHOD FOR CURING RESIN

[75] Inventor: Osamu Isozaki, Yokohama, Japan

[73] Assignee: Kansai Paint Co., Ltd., Hyogo, Japan

[21] Appl. No.: 653,479

[22] Filed: May 24, 1996

Related U.S. Application Data

[62] Division of Ser. No. 297,517, Aug. 29, 1994, abandoned, which is a continuation of Ser. No. 645,253, Jan. 24, 1991, abandoned.

[30] Foreign Application Priority Data

Jan. 25, 1990 [JP] Japan .................................. 2-13539

[51] Int. Cl.⁶ .................. C08F 283/00; C08F 283/04; C08L 77/00
[52] U.S. Cl. .................. 525/529; 525/123; 525/284; 525/326.2; 525/327.2; 525/329.7; 525/330.1; 525/330.3; 525/420; 525/424; 525/430; 525/437; 525/440; 525/453; 525/523; 525/533; 526/266; 526/270; 528/106

[58] Field of Search ................... 525/529, 123, 525/420, 424, 430, 437, 440, 453, 523, 533, 326.2, 327.2, 329.7, 330.1, 330.3, 284; 528/106; 526/266, 270

[56] References Cited

U.S. PATENT DOCUMENTS 3,787,366  1/1974  Vaughn .................................. 260/64
4,156,067  5/1979  Gould .................................... 528/73

*Primary Examiner*—Ana Woodward
*Attorney, Agent, or Firm*—Wenderoth, Lind & Ponack

[57] ABSTRACT

In a method for curing a resin by utilizing an intramolecular crosslinking reaction, the improvement wherein the crosslinking reaction is a ring opening addition reaction between a lactone structure and an active hydrogen-containing functional group.

6 Claims, No Drawings

METHOD FOR CURING RESIN

This is a Divisional application of Ser. No. 08/297,517, filed Aug. 29, 1994, now abandoned which in turn is a Continuation of application Ser. No. 07/645,253, filed Jan. 24, 1991, both applications being abandoned.

This invention relates to a novel method for curing a resin.

There has been hitherto well known a method for three-dimensionally crosslinking and curing a synthetic resin by using a curing agent (crosslinking agent) such as a melamine resin or a polyisocyanate compound. However, when using the melamine resin, by-products such as alcohols, aldehydes, water, etc. occur during a curing reaction, deteriorating physical properties of a cured product. Meanwhile, when using the polyisocyanate compound, a system is a two-package system which is intricate to treat.

The present inventors have made extensive studies to eliminate the above conventional defects in curing the synthetic resin and develop a novel curing method in which a system is a one-package system and occurrence of by-products is little observed in the curing reaction. As a result, they have this time found that the above object can be achieved by a curing method chiefly utilizing a ring opening or addition reaction of a lactone structure, and completed this invention.

Thus, according to this invention, there is provided a method for curing a resin by utilizing an intermolecular or intramolecular crosslinking reaction of a resin, characterized in that the crosslinking reaction is a ring opening polymerization reaction between lactone structures and/or a ring opening addition reaction between a lactone structure and an active hydrogen-containing functional group.

The resin is generally crosslinked and cured by, for example, chemically bonding molecules of a resin having a straight-chain structure (including also a chain structure with a branched chain) in three-dimensional network such that the molecules of said resin are bridged intermolecularly and/or intramolecularly.

This invention is characterized in that the resin is crosslinked and cured chiefly utilizing a ring opening reaction of a lactone structure contained in a straight-chain resin. The lactone structure is preferably a 4- to 9-membered cyclic functional group having an ester linkage in a ring. In one aspect of this invention, the resin is presumably crosslinked and cured such that the lactone ring is opened at the ester linkage site either by heating or with a catalyst, and then attacks the other lactone structure to form a polyester structure (ring opening polymerization), as shown in the following reaction scheme A.

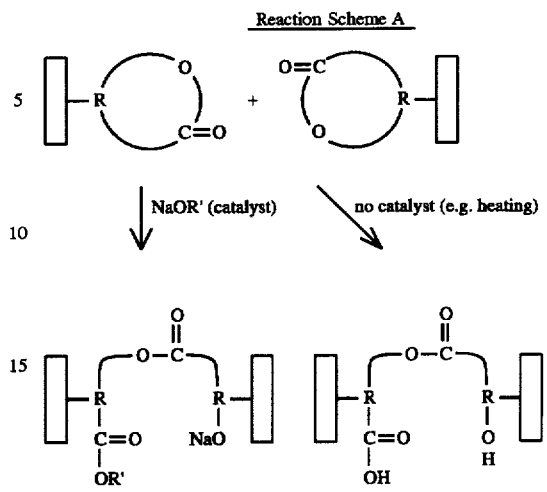

wherein R denotes a saturated aliphatic hydro-carbon group having preferably 2 to 7 carbon atoms, denotes a resin body and R' denotes an alkyl group such as an ethyl group.

In another aspect of this invention, the lactone structure can be subjected to a ring opening addition reaction with active hydrogen-containing functional groups such as a hydroxyl group, a carboxyl group and an amino group, thereby crosslinking and curing the resin.

The crosslinking and curing reaction between the lactone structure and the active hydrogen-containing functional group is thought to typically proceed as shown in the following reaction scheme B.

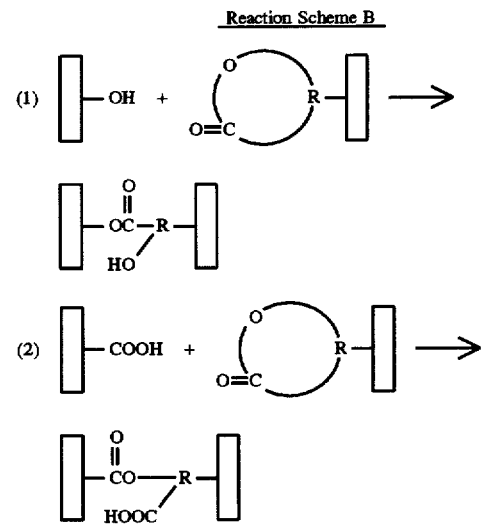

-continued
Reaction Scheme B

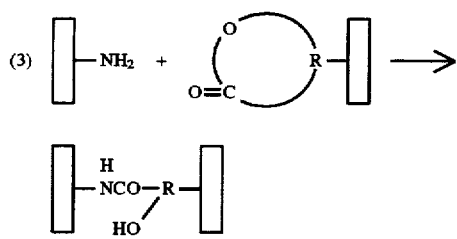

wherein

is as defined above.

As the crosslinking and curing reaction usually little proceeds at room temperature, there are advantages that a resin which can be cured according to this invention is excellent in storage stability and usable as a one-package type. Moreover, compared with an ordinary method for curing a resin with a curing agent such as an amino resin, etc., the method of this invention little or never allows formation of by-products in the crosslinking and curing reaction. In consequence, when the method of this invention is applied to paints, a coating surface having excellent smoothness can be formed and an internal stress of a coating film is low so that a coating surface excellent in adhesion to a surface being coated can be provided.

The lactone structure can be formed by the following methods which are known per se. However, they are not critical in this invention.

(1) Formation by an oxidation reaction and a reduction reaction (a) Formation by peroxidation of a cyclic ketone A cyclic ketone enlarges the ring and forms a lactone by a peracid.

(b) Formation by oxidation of a cyclic ether

A cyclic ether is oxidized with chromic acid, t-butyl chromate or ruthenium oxide to form a lactone.

(c) Formation by reduction of an acid anhydride

When an acid anhydride is reduced with metallic sodium-alcohol, lithium aluminum hydride or lithium aluminum tri-t-butoxy hydride, a lactone structure is formed. It is also formed using chlorotris(triphenylphosphine) rhodium.

(2) Formation by ring closure of a carboxylic acid or its derivatives (a) Formation from a hydroxycarboxylic acid or its esters When a hydroxycarboxylic acid is treated with an acid, dehydration takes place to form a lactone. For example, a gamma-hydroxycarboxylic acid and a delta-hydroxycarboxylic acid provide a gamma-lactone and a delta-lactone respectively. Examples of the acid are mineral acids such as sulfuric acid and hydrochloric acid, and organic acids such as p-toluenesulfonic acid. The lactone can be formed using an acid anhydride (e.g. acetic anhydride and trifluoroacetic anhydride) or phosgene.

(b) Formation from an unsaturated carboxylic acid or its esters

A beta,gamma-unsaturated carboxylic acid is easily ring-closed in the presence of an acid to form a gamma-lactone. Examples of the acid are sulfuric acid and trifluoroacetic acid. 4-Pentenoic acid forms a gamma-lactone and 5-methyl-4-hexenoic acid forms a gamma-lactone. When an olefinic carboxylic acid is reacted with a peracid, a hydroxy-lactone is formed. Moreover, an ester having a cyclopropyl group can be lactonized with an acid.

(c) Formation from an olefinic diazo ester

A carbene formed by decomposition of a diazo ester having a double bond is added to a double bond in a molecule to form cyclopropyl lactone. A diazo malonic acid ester also forms a lactone. A compound having a cyclopropylcarbonyl group can be converted into a gamma-lactone with a cyclopropane ring cleaved.

(3) Formation by carbonylation and introduction of a carboxylic acid residue (a) Formation by carbonylation of acetylene carbinol When an alcohol having terminal acetylene is carbonylated, a lactone is formed. For example, when beta-hydroxyacetylene is carbonylated with carbon monoxide, alpha-methylene lactone results, and butenolyd is formed from ethenyl carbinol. Further, when vinyl alcohol is carbonylated, a lactone is obtained.

(b) Formation by a reaction between a ketone and a ketene

An aldehyde or a ketone is condensed with a ketene in the presence of a Lewis acid as a catalyst to form a beta-lactone. Dimethyl ketene is condensed with cyclopropane to form spiro-beta-lactone. Dichloroketene is concensed with an aldehyde to form alpha,alpha-dichloro-beta-lactone. An unsaturated delta-lactone is formed by a reaction of an alpha,beta-unsaturated aldehyde and/or a ketone with a ketene.

(c) Formation by introduction of a carboxylic acid residue into an epoxide

Active methylene compounds such as a malonic acid ester, ethyl cyanoacetate and ethyl acetoacetate form corresponding gamma-lactone derivatives respectively. Oxirane is condensed with a ketene to form a gamma-lactone.

As a method to bond the thus formed lactone structure to a resin molecule, it is possible to introduce a substituent in the lactone structure and chemically bond the lactone structure to a resin substrate utilizing the substituent. The substituent is introduced into the lactone structure by e.g. carboxylation or hydroxymethylation of an alpha-position of the lactone ring. A hydroxyl group can be added by subjecting a beta-position of the lactone ring to a Michael condensation. An isocyanate group can also be introduced by adding a polyisocyanate compound to the hydroxyl group.

The substituent (e.g. a hydroxyl group, a carboxyl group and an isocyanate group) introduced into the lactone structure as above is reacted with a functional group introduced in the resin substrate, thereby making it possible to introduce the lactone into the resin substrate. The functional group that can be introduced into the resin substrate may be any group that is mutually reacted with the substituent of the lactone structure. Examples of such group are a hydroxyl group, a carboxyl group, an epoxy group and an isocyanate group. The resin substrate into which these functional groups are introduced is not limited in particular, and can optionally be selected depending on the use purpose of the resin. Examples thereof are an acrylic resin, a vinyl resin, a polyester (alkyd) resin, a polyamide resin, a polyurethane resin, an epoxy resin and a fluorine resin. It is advisable that the resin substrate has a number average molecular weight of usually 200 to 100,000, preferably 200 to 50,000 and more preferably 200 to 20,000. The above functional group can be introduced into such resin substrate in a manner known per se.

A preferable combination of the functional group of the resin substrate for introducing the lactone structure into the resin substrate and the substituent of the lactone structure is listed below.

| Functional group of a resin substrate | Substituent of a lactone structure |
|---|---|
| Hydroxyl group | Carboxyl group, epoxy group, isocyanate group |
| Carboxyl group | Hydroxyl group, amino group, epoxy group |
| Epoxy group | Carboxyl group, hydroxyl group, thiol group, amino group, hydroxyl group |
| Isocyanate group | Hydroxyl group, amino group |

Another method to introduce the lactone structure into the resin substrate is that a polymerizable unsaturated monomer containing a lactone structure is singly polymerized or copolymerized with another polymerizable monomer. Examples of the polymerizable unsaturated monomer containing the lactone structure are monomers represented by formulas

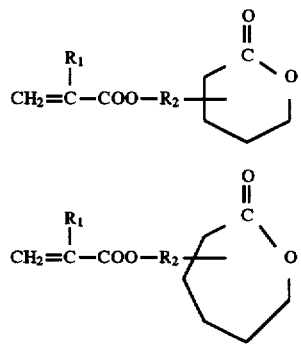

wherein $R_1$ denotes H or $CH_3$ and $R_2$ denotes a $C_{1-8}$ hydrocarbon group.

The other monomer copolymerizable with these monomers is preferably the polymerizable unsaturated monomer (the vinyl monomer or the acrylic monomer) used in forming the vinyl resin or the acrylic resin.

Further, when maleic anhydride is copolymerized with allyl alcohol, ring closure is conducted in polymerization to obtain a lactone structure-containing vinyl polymer as shown in the following reaction scheme C.

Reaction Scheme C

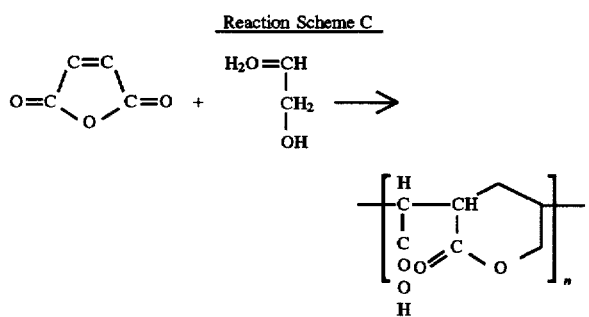

The number of the lactone structure being introduced can be at least 2, preferably 3 to 30, more preferably 5 to 15 per molecule.

In the method of this invention, a resin having a lactone structure and an active hydrogen-containing group per molecule is also available. When using such resin, the lactone structures or the lactone structure and the active hydrogen-containing functional group cause the intermolecular or intramolecular ring opening bonding reaction to conduct crosslinking and curing.

Such resin can be formed by reacting part of the functional group of the resin substrate having introduced therein the active hydrogen-containing functional group with the substituent of the lactone structure. Said resin can contain at least 1, preferably 3 to 30, more preferably 5 to 15 lactone structures and at least 1, preferably 3 to 10, more preferably 5 to 15 active hydrogen-containing functional groups.

Further, in the method of this invention, a mixture of the aforesaid lactone structure-containing resin and the resin having the active hydrogen-containing functional group is also available.

As the active hydrogen-containing functional group, a hydroxyl group, a carboxyl group and an amino group are most preferable to expedite the crosslinking reaction with the lactone structure. A hydrosilyl group and a thiol group are also available.

The resin having the active hydrogen-containing functional group can be produced, for example, by polymerizing or adding the compound having the active hydrogen-containing functional group in or after forming the resin substrate as above.

The resin having the active hydrogen-containing functional group has a number average molecular weight of usually 500 to 100,000, preferably 1,000 to 50,000, more preferably 2,000 to 30,000. The number of the active hydrogen-containing functional group is at least 2, preferably 3 to 30, more preferably 5 to 15 per molecule.

The method of this invention crosslinks and cures the resin based chiefly on the ring opening reaction of the lactone structure. To be concrete, the ring opening polymerization reaction between the lactone structures (see Reaction Scheme A) and the ring opening addition reaction of the lactone structure and the active hydrogen-containing functional group (see Reaction Scheme B) are taken. This invention crosslinks and cures the resin by the reaction based on one or both of these reactions.

Accordingly, it is advisable to perform the method of this invention using the following resins (A) to (C) either singly or in combination of two or more.

(A) A resin containing per molecule at least 2, preferably 3 to 30, more preferably 5 to 15 (or per kg of the resin, 0.1 to 15 mols, preferably 0.3 to 10 mols, more preferably 1.0 to 5 mols of) lactone structures.

(B) A mixture of the resin (A) and a resin containing per molecule, at least 2, preferably 3 to 30, more pferably 5 to 15 (or per kg of the resin, 0.1 to 15 mols, preferably 0.3 to 10 mols, more preferably 1.0 to 5 mols of) active hydrogen-containing functional groups. The amount of the resin (A) is usually 5 to 95% by weight, preferably 20 to 50% by weight based on the total weight of both the resins (A) and (B), and the amount of the resin B is usually 95 to 5% by weight, preferably 50 to 20% by weight on the same basis.

(C) A resin containing a lactone structure and an active hydrogen-containing functional group in a molecule. The lactone structure/active hydrogen-containing functional group molar ratio is usually 5/1 to 1/5, preferably 3/1 to 1/3.

In the aspect of curability, the resin (C) is best, the resin (A) is better and the resin (B) is good.

In the method of this invention, the conditions for crosslinking and curing the resin selected from the resins (A) to (C) vary with the lactone structure. The heating (baking) temperature is usually at least 80° C., especially preferably 140° to 200° C. When heating is conducted at the above temperature usually for 10 to 30 minutes, the resin is crosslinked and cured.

In order to decrease the crosslinking and curing temperature or shorten the heating temperature, said resin may be blended with the following catalyst in an amount of 0.01 to 10 parts by weight per 100 parts by weight of the resin.

1. Catalyst for anionic polymerization:

For example, Li, Na, K, Na-naphthalene, $Li_2$-benzophenone, $K_2$-benzophenone, LiR, NaR, LiH, NaH, $K_2CO_3$, KOH, NaOR, LiOR, acetates of Li, Na and K, and tertiary amines such as pyridine, picolin and quinoline.

2. Catalyst for coordination anionic polymerization:

For example, $AlR_3$, $ZnR_2$, $MgR_2$, RMgX, $R_2AlX$, $RAlX_2$, $R_2Al(OR')$, $AlEt_3$—$H_2O$, $Zn(C_2H_5)_2$—$H_2O$, $Cd(C_2H_5)_2$—$H_2O$, $Al(OR)_3$, $Mg(OR)_2$, $Ti(OR)_4$ and titanium phosphate.

3. Catalyst for cationic polymerization:

$AlCl_3$, $BF_3·(C_2H_5)_2O$, other metal halides, $CF_3CO_2H$, acetyl perchlorate, toluenesulfonic acid and phosphoric acid.

In the above description, R and R' each denote a hydrocarbon group having 1 to 10 carbon atoms and X denotes a halogen atom.

In the method of this invention, the resins (A) to (C) can be blended with a coloring pigment, a metallic pigment and an extender pigment. It is advisable that the resin is used by being dissolved or dispersed in an organic solvent and/or water.

Moreover, it is also possible, if required, to asdd to said resin a low-molecular polyol (a number average molecular weight less than 500) such as glycol or triol and a lactone compound (a number average molecular weight less than 500) such as valerolactone or caprolactone.

The method of this invention can advantageously be utilized in the field of paints, ink, adhesives, tackifiers and molded articles.

Preparation Example 1

A vinyl monomer (212 g:1 mol) represented by formula,

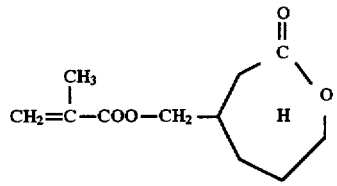

400 g of methyl methacrylate, 130 g of 2-hydroxyethyl methacrylate and 256 g of ethyl acrylate were copolymerized to form a vinyl resin (1) having a number average molecular weight of 15,000.

This resin contains 1 mol/kg of a caprolactone structure and 1 mol/kg of a primary hydroxyl group.

Preparation Example 2

A compound (260 g: 2 mols) of a structure represented by formula

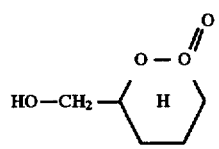

was reacted with 730 g of a polyurethane resin with terminal NCO of a hexamethylenediisocyanate type to form a polyurethane resin (2) containing a terminal valerolactone structure and having a number average molecular weight of 5,000.

This resin contains 2 mols/kg of the valerolactone structure.

Preparation Example 3

One thousand grams of a bisphenol A-type diepoxy resin having a number average molecular weight 1,000 was reacted with 2 mols of ketene in the presence of a catalytic amount of trifluoroboron etherate to introduce a butyrolactone structure in the end.

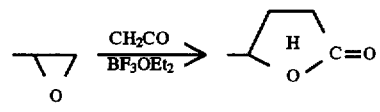

This resin (3) contains 1.85 mols/kg of the butyrolactone structure and 1.85 mol/kg of a secondary hydroxyl group.

Preparation Example 4

A compound (432 g:3 mols) of a structure represented by formula

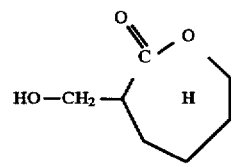

was condensed with 300 g of a polyester resin with a terminal carboxyl group having a number average molecular weight of 3,000 to form a polyester resin (4) containing a caprolactone structure and having a molecular weight of 3,500.

This resin contains 0.57 mol/kg of the caprolactone structure and 1.0 mol/kg of the carboxyl group.

Preparation Example 5

Hydrogenated bisphenol A was oxidized into a diketone which was then reacted with peracetic acid to obtain a resin (5) of a structure represented by the formula.

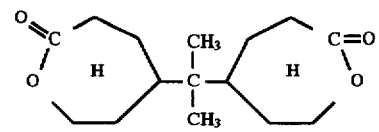

This resin contains 7.5 mols/kg of caprolactone and has a number average molecular weight of 268.

Preparation Example 6

2-Hydroxyethyl acrylate (17.2 parts), 30 parts of styrene and 52.8 parts of n-butyl acrylate were added dropwise together with 4 parts of azobisisobutylonitrile to 100 parts of xylol (solvent) heated at 110° C. over about 3 hours. Thereafter, the mixture was aged at the same temperature for 3 hours to obtain a hydroxyl group-containing copolymer (6) having a number average molecular weight of about 18,000.

Preparation Example 7

Dimer acid and ethylenediamine were subjected to dehydrocondensation reaction at 200° C. at a dimer acid/ethylenediamine molar ratio of 1/1.2 to obtain an amino group-terminated polyamide resin (7) having a molecular weight of about 1,000.

EXAMPLES (a) The resin (1) alone was baked at 170° C. for 60 minutes.

(b) The resin (2) and the hydroxyl group-containing copolymer (6) were mixed at a weight ratio of 1:1, and 0.1% of tetrabutyl titanate was added thereto. The mixture was baked at 120° C. for 30 minutes.

(c) $AlCl_3$ (3 %) was added to the resin (3) alone, and the mixture was baked at 200° C. for 30 minutes.

(d) The resin (4) was mixed with 30% of epsilon-caprolactone, and 1% of tris(acetylacetonato)aluminum was added thereto. The mixture was baked at 140° C. for 30 minutes.

(e) The resin (5) and the amino group-terminated polyamide resin (7) ($NH_2$ 2 mols/kg) were mixed at a weight ratio of 1:1, and the mixture was baked at 200° C. for 30 minutes.

The characteristics of the crosslinked cured resins obtained in (a) to (e) are tabulated below.

|  | (a) | (b) | (c) | (d) | (e) |
|---|---|---|---|---|---|
| Wiped 20 times with xylol | No change | No change | Gloss slightly | No change | No change |
| Tukon hardness | 18 | 10 | 5.5 | 8 | 11 |

What we claim is:

1. In a method for curing a resin by utilizing an intramolecular cross-linking reaction, the improvement wherein the cross-linking reaction is initiated by the ring opening of a lactone ring and addition reaction with an active hydrogen-containing functional group involving a resin selected from the group consisting of acrylic resins, vinyl resins, polyester (alkyd) resins, polyamide resins, epoxy resins and fluorine resins containing at least one 4- to 9- membered lactone ring and at least one active hydrogen-containing functional group selected from the group consisting of a hydroxyl group, a carboxyl group, and an amino group per molecule, said lactone ring being bound to a main chain of the resin as a pendant and/or a terminal group.

2. The method of claim 1 wherein the resin contains 5 to 15 lactone rings and 5 to 15 active hydrogen-containing functional groups per molecule.

3. The method of claim 1 wherein the resin has a molar ratio of the lactone rings to the active hydrogen-containing functional group of 5/1 to 1/5.

4. The method of claim 1 wherein the resin has 3 to 30 lactone rings per molecule and 3 to 30 active hydrogen-containing functional groups per molecule.

5. The method of claim 1 wherein the resin is formed by reacting a diepoxy resin and a ketene.

6. The method of claim 1 wherein curing is conducted at a temperature of 140° to 200° C.

* * * * *